(12) United States Patent
Hunt et al.

(10) Patent No.: US 9,016,330 B2
(45) Date of Patent: Apr. 28, 2015

(54) SYSTEM, DEVICE, AND METHOD FOR TREATING FUEL

(76) Inventors: Robert J. Hunt, Providence, UT (US); Gaylen W. Ercanbrack, Logan, UT (US)

(*) Notice: Subject to any disclaimer, the term of this patent is extended or adjusted under 35 U.S.C. 154(b) by 270 days.

(21) Appl. No.: 13/545,773

(22) Filed: Jul. 10, 2012

(65) Prior Publication Data

US 2013/0014853 A1 Jan. 17, 2013

Related U.S. Application Data

(60) Provisional application No. 61/506,999, filed on Jul. 12, 2011, provisional application No. 61/549,390, filed on Oct. 20, 2011.

(51) Int. Cl.
*B60K 15/04* (2006.01)
*B60K 15/03* (2006.01)
*F02M 37/00* (2006.01)

(52) U.S. Cl.
CPC .......... *B60K 15/03* (2013.01); *B60K 2015/0493* (2013.01); *B60K 15/04* (2013.01); *B60K 2015/03348* (2013.01); *B60Y 2200/145* (2013.01); *F02M 37/0076* (2013.01)

(58) Field of Classification Search
CPC .... B60K 15/04; B60K 15/0406; B60K 15/05; B60K 2015/03348; B60K 2015/0458
USPC ............... 141/9, 98, 100, 105–107, 285, 301, 141/348–350; 220/86.2; 123/1 A
See application file for complete search history.

(56) References Cited

U.S. PATENT DOCUMENTS

| 3,620,424 | A | | 11/1971 | Grigsby | |
|---|---|---|---|---|---|
| 4,161,160 | A | | 7/1979 | Hicks et al. | |
| 4,253,436 | A | * | 3/1981 | Dudrey | 123/198 A |
| 4,402,351 | A | | 9/1983 | Momura et al. | |
| 4,596,277 | A | | 6/1986 | Djordjevic | |
| 4,621,593 | A | | 11/1986 | Rao et al. | |
| 4,936,261 | A | * | 6/1990 | Naumann et al. | 123/1 A |
| 4,944,779 | A | * | 7/1990 | Szlaga et al. | 96/109 |
| 4,971,118 | A | | 11/1990 | Cluff | |
| 5,209,210 | A | * | 5/1993 | Ikeda et al. | 123/520 |
| 5,331,994 | A | | 7/1994 | Bryan, III et al. | |
| 5,421,295 | A | | 6/1995 | Lemaire et al. | |
| 5,850,819 | A | * | 12/1998 | Kunimitsu et al. | 123/520 |
| 5,992,473 | A | | 11/1999 | Hammonds | |
| 6,095,371 | A | * | 8/2000 | Mooney | 222/57 |
| 6,321,692 | B1 | | 11/2001 | Rayner | |
| 6,942,124 | B2 | | 9/2005 | Dehn et al. | |
| 6,981,532 | B2 | | 1/2006 | Dehn et al. | |
| 7,159,741 | B2 | | 1/2007 | Dehn et al. | |
| 7,216,681 | B2 | | 5/2007 | Valentine et al. | |
| 7,270,088 | B2 | * | 9/2007 | Whitehall | 123/1 A |

(Continued)

*Primary Examiner* — Nicolas A Arnett
(74) *Attorney, Agent, or Firm* — David L. Stott

(57) ABSTRACT

A device, system and/or method for dispensing a fuel additive to a fuel tank that employs a fuel additive delivery device secured to an opening of the fuel tank. The delivery device is fluidly coupled to a fuel additive reservoir. The delivery device includes a cap that automatically opens or closes fluid communication with the fuel additive reservoir. The delivery device also includes a bore defined through the delivery device configured to receive a fuel filler spout with a fuel passageway outlet positioned in the bore such that, as fuel passes through the bore and into the fuel tank, the bore is configured to create a suction at the fuel additive outlet to pull fuel additive from the reservoir, through the delivery device, and into the fuel tank with the fuel.

21 Claims, 5 Drawing Sheets

(56) References Cited

U.S. PATENT DOCUMENTS

| | | |
|---|---|---|
| 7,428,890 B2 | 9/2008 | Lay et al. |
| 7,469,661 B2 | 12/2008 | Kunstmann et al. |
| 7,523,722 B2 | 4/2009 | Valentine et al. |
| 7,743,737 B2 | 6/2010 | Valentine et al. |
| 2003/0028285 A1 | 2/2003 | Zura et al. |

* cited by examiner

SYSTEM, DEVICE, AND METHOD FOR TREATING FUEL

CROSS-REFERENCE TO RELATED APPLICATIONS

This application claims the benefit of U.S. Provisional Application No. 61/506,999, filed Jul. 12, 2011, and U.S. Provisional Application No. 61/549,390, filed Oct. 20, 2011, the contents of each of which are hereby incorporated by reference in their entirety.

TECHNICAL FIELD

The present invention relates generally to systems, devices and methods for treating fuel and, more particularly, the present invention relates to automatically dispensing a fuel additive to fuel in a fuel tank.

BACKGROUND

Reduction of fuel consumption is an important factor in many businesses, especially in the commercial truck market or any market where fuel consumption plays a large role in its business. One method of reducing fuel consumption is by adding a fuel additive to the fuel in a fuel tank. Other known benefits of employing fuel additives to your fuel include increased engine performance and efficiency, prevention of deposit buildup, enhancing lubrication, all of which will save a great deal of money. Essentially, fuel additives are compounds formulated to enhance the quality and efficiency of the fuels used in motor vehicles. Adding fuel additives to fuel can be done in a variety of ways, however, it is desirable that the resulting mixture be uniformly mixed, have the proper ratio added to the fuel, and be non-electrically operated to avoid the potential safety consequences when dealing with combustible fuels. Further, although manually emptying the contents of fuel additive may be a simple solution, the commercial truck market, for example, has found poor reliability with many of the truckers implementing this manual task.

As such, it would be advantageous to provide a fully mechanical device, system and/or method that automatically dispenses fuel additive to a fuel tank with the proper ratio and also results in a substantially uniform mixture.

BRIEF SUMMARY OF THE INVENTION

Embodiments of the present invention are directed to various devices, systems and methods of treating fuel with a fuel additive. For example, in one embodiment, a fuel treatment system is configured to automatically dispense a fuel additive to a fuel tank. The fuel treatment system includes a container and a fuel additive delivery device. The container is configured to hold a fuel additive therein and is operatively coupled to the fuel additive delivery device. The fuel additive delivery device defines a bore extending therethrough and a fuel additive passageway extending at least partially adjacent the bore. The bore extends between an upper opening and a lower opening of the fuel additive delivery device. The delivery device is configured to connect to an opening of the fuel tank such that the lower opening is positioned within the fuel tank. In addition, the fuel additive delivery device includes a spring biased plunger and a cap. The spring biased plunger is positioned adjacent the upper opening and is moveable within the fuel additive passageway between an open position and a closed position. The open position is configured to facilitate the fuel additive to advance from the container, through the fuel additive passageway, and into the bore of the fuel additive delivery device. The cap is configured to be positioned over the upper opening of the fuel additive delivery device so as to prevent fluid from entering the fuel tank and to maintain the spring biased plunger in the closed position to block the fuel additive passageway, and, upon the cap being removed from the upper opening, the spring biased plunger is biased toward and moved to the open position.

In one embodiment, the fuel additive delivery device is configured to sealingly connect to the opening of the fuel tank. Further, in another embodiment, the fuel additive delivery device includes one or more air passageways defined therein. Each passageway extends through the delivery device between a first end and a second end of the passageway such that, upon the cap being removed from the upper opening, the first end is positioned on the delivery device so as to be above the fuel tank and the second end is positioned to be within the fuel tank. In still another embodiment, the container includes a conduit extending to the fuel additive passageway defined in the fuel additive delivery device.

In another embodiment, the bore defined in the fuel additive delivery device includes a nozzle defined therein with a narrow neck configured to manipulate a pressure of fluid passing through the nozzle. Further, the fuel additive passageway includes a fuel additive outlet adjacent the narrow neck of the nozzle so as to facilitate the fuel additive to be drawn from the container as fuel passes through the nozzle. In another embodiment, the fuel additive passageway extends through a portion of the fuel additive delivery device between a fuel additive inlet and a fuel additive outlet. Such fuel additive inlet is configured to receive the fuel additive from the container and the fuel additive outlet is configured to be exposed adjacent a narrow neck defined in the bore of the delivery device.

In another embodiment, the container is positioned adjacent the fuel additive delivery device such that, upon the plunger being in the open position, the fuel additive advances through the fuel additive passageway by gravity. In one embodiment, the container is positioned adjacent the fuel additive delivery device such that, upon the plunger being in the open position, the fuel additive advances through the fuel additive passageway by a combination of influences of gravity and being drawn from the container.

In another embodiment, the spring biased plunger includes a blocking portion and a bypassing portion. Such a blocking portion is configured to block the fuel additive passageway upon the spring biased plunger being in the closed position. Further, the bypassing portion is sized smaller than the blocking portion so as to facilitate the fuel additive to advance upon the plunger being in the open position.

In accordance with another embodiment, a fuel additive delivery device is configured to dispense a fuel additive into a fuel tank from a fuel additive container. The fuel additive delivery device includes a structure, a spring biased plunger, and a cap. The structure is configured to be connected to an opening of the fuel tank. Further, the structure defines a bore extending therethrough and a fuel additive passageway extending at least partially adjacent the bore. The bore extends between an upper opening and a lower opening of the structure. The structure is configured to be positioned around the opening of the fuel tank with the lower opening disposed within the fuel tank. The spring biased plunger is positioned adjacent the upper opening and moveable within the fuel additive passageway between an open position and a closed position. The open position is configured to facilitate the fuel additive to advance from the fuel additive container, through the fuel additive passageway, and into the bore of the structure. The cap is configured to be positioned over the upper opening of the structure so as to prevent fluid from entering the fuel tank and to maintain the spring biased plunger in the closed position to block the fuel additive passageway, and, upon the cap being removed from the upper opening, the spring biased plunger is biased toward and moved to the open position.

The structure of the fuel additive delivery device is configured to sealingly connect to the opening of the fuel tank. In one embodiment, the structure includes one or more air passageways defined therein. Each passageway extends through the structure between a first end and a second end of the passageway such that, upon the cap being removed from the upper opening, the first end is positioned on the delivery device so as to be above the fuel tank and the second end is positioned to be within the fuel tank.

In one embodiment, the bore defined through the structure includes a nozzle defined therein with a narrow neck configured to manipulate a pressure of fluid passing through the nozzle. Further, in one embodiment, the fuel additive passageway comprises a fuel additive outlet exposed adjacent the narrow neck of the nozzle configured to facilitate the fuel additive to be drawn from the container as fuel passes through the nozzle. In another embodiment, the fuel additive passageway extends through a portion of the structure between a fuel additive inlet and a fuel additive outlet. The fuel additive inlet is configured to receive the fuel additive from the container and the fuel additive outlet is configured to be exposed adjacent a narrow neck defined in the bore of the delivery device.

In another embodiment, upon the plunger being in the open position, the fuel additive passageway is configured to facilitate the fuel additive to advance at least partially by gravity. Further, in another embodiment, upon the plunger being in the open position, the fuel additive passageway is configured to facilitate the fuel additive to advance by a combination of influences of gravity and being drawn from the container.

In another embodiment, the spring biased plunger includes a blocking portion and a bypassing portion. The blocking portion is configured to block the fuel additive passageway upon the spring biased plunger being in the closed position, and the bypassing portion is sized smaller than the blocking portion so as to facilitate the fuel additive to advance upon the plunger being in the open position.

In accordance with another embodiment of the present invention, a method of dispensing fuel additive to a fuel tank is provided. The method includes providing a fuel additive delivery device connected to an opening of the fuel tank, the delivery device defining a bore extending therethrough between an upper opening and a lower opening and defining a fuel additive passageway extending at least partially adjacent to the bore, the lower opening positioned within the fuel tank and the upper opening positioned above the fuel tank; removing a cap secured to the upper opening, removal of the cap simultaneously moving a spring loaded plunger from a blocking position to an open position to facilitate fuel additive to advance from a fuel additive container toward the bore of the fuel additive delivery device; inserting a fuel nozzle into the upper opening of the bore and passing fuel through the bore to fill the fuel tank; advancing fuel additive from the fuel additive container through the fuel additive passageway into the bore for mixing with the fuel in the fuel tank; and replacing the cap over the upper opening and simultaneously pushing the spring loaded plunger to a blocking position in the fuel additive passageway to prevent fuel additive from advancing in the passageway.

In another embodiment, the delivery device includes a tapered surface and a tab arrangement configured to seal and mount the delivery device to a fuel tank.

These various embodiments may include other components, features or acts as will be apparent from the detailed description set forth below. Additionally, other embodiments, configurations, and processes are set forth below in the detailed description of the invention.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
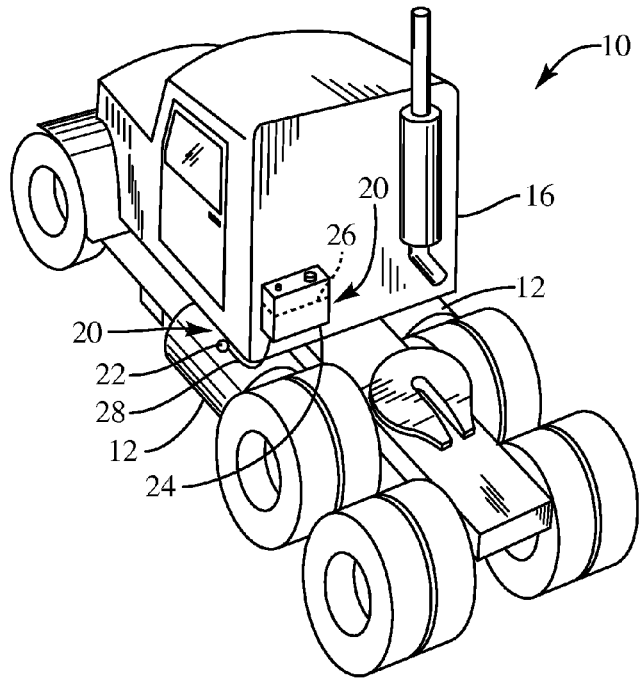
FIG. 1 is a perspective view of a truck with a fuel tank with a fuel additive dispensing system coupled to the truck, according to an embodiment of the present invention.

Referring to FIG. 1, a fuel additive dispensing system 20 is shown coupled to a body 16 of a truck 10 and one of its fuel tanks 12. The fuel additive dispensing system 20 of the present invention provides an automatic system for dispensing fuel additive 26 into the fuel tank 12 as the fuel tank 12 is being filled with fuel. Although the present invention may be employed with trucks, the fuel additive dispensing system 20 may be used with other types of vehicles or in conjunction with other types of combustion engines/machines where it is useful to automatically dispense fuel additive to a fuel tank.

The fuel additive dispensing system 20 may include a fuel additive delivery device 22 and a container 24. The fuel additive delivery device 22 may be coupled to a fuel tank 12 and, more particularly, to an opening (not shown) of the fuel tank 12. Such opening may be the opening typically employed for filling the fuel tank 12 with fuel. The container 24 is configured to hold a fuel additive 26 (shown in outline) and may be positioned on the body 16 of the truck 10 or at another suitable attachment position. The container 24 and the fuel additive delivery device 22 are coupled via a conduit 28 or hosing extending therebetween.

Figure 2:
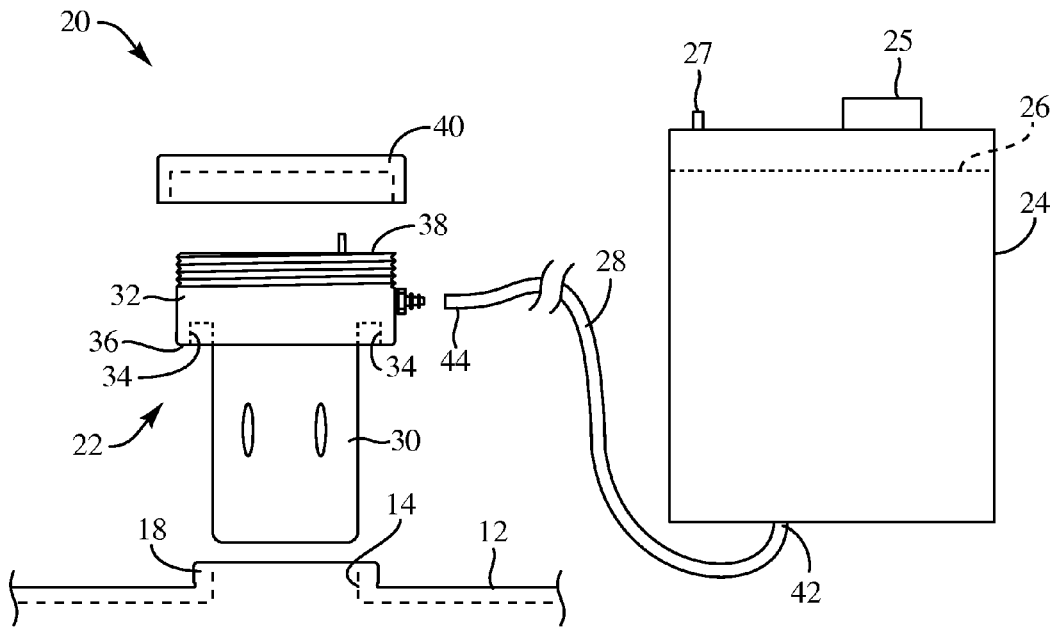
FIG. 2 is a partial side view of the various components of the fuel additive dispensing system and the fuel tank, according to one embodiment of the present invention.

FIG. 2 illustrates a profile view of the various components of the fuel additive dispensing system 20 and the attachment points that may be employed. For example, the fuel additive delivery device 22 may include a lower portion 30 and an upper portion 32. The lower portion 30 may be sized and configured to be positioned within the fuel tank 12 such that the upper portion 32 is positioned above the fuel tank 12. The fuel additive delivery device may include a channel 34 defined at an underside 36 of the upper portion 32. The channel 34 may be ring shaped sized and configured to correspond with a rim 18 of the opening 14 of the fuel tank 12. Also, the fuel additive delivery device may include a cap 40. The cap 40 may be sized and configured to rotatably attach to the upper portion 32 of the delivery device 22 so as to cover a top face 38 of the delivery device 22. Also, the container 24 configured to carry fuel additive 26 (shown in outline form) may be coupled to the delivery device 22 via the conduit 28 or hosing. The conduit 28 may include a first end 42 and a second end 44 such that the first end 42 is coupled to the container 24 and the second end 44 is coupled to the upper portion 32 of the fuel additive delivery device 22. The first end 42 of the conduit 28 may be sealingly attached to the container 24 or attached in a manner that prohibits fuel additive from escaping the container 24. The conduit 28 may also extend from the container 24 at an underside of the container 24 or from any other suitable location of the container 24. The second end 44 of the conduit 28 may be attached to the upper portion 32 of the delivery device 22 in any suitable manner known in the art such that the conduit 28 is sealed at the second end 44 to the delivery device 22. In addition, the container may include a container cap 25 and an air vent 27.

Figure 3:
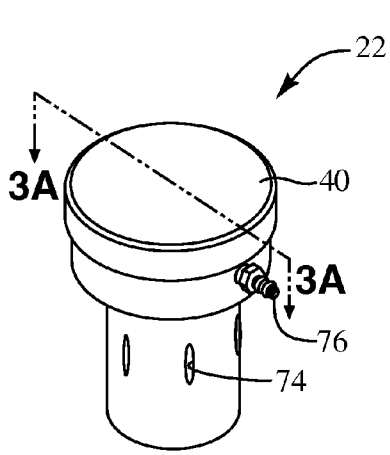
FIG. 3 is a perspective view of a fuel additive delivery device, according to an embodiment of the present invention.
Figure 3A:
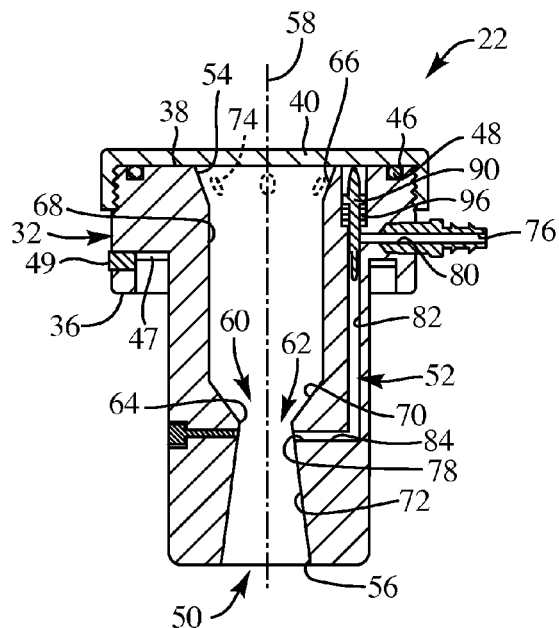
FIG. 3A is a cross-sectional view of the fuel additive delivery device, taken along section line "3A" of FIG. 3, depicting the spring biased plunger in a closed or blocking position, according to an embodiment of the present invention.

Referring now to FIGS. 3 and 3A, the fuel additive delivery device 22 with the cap 40 positioned thereon is shown. The fuel additive delivery device 22 may be a generally cylindrical configuration, however, other configurations may also be employed as long as the delivery device can sealingly connect to the opening of the fuel tank. The fuel additive delivery device 22, as shown in cross-section, defines a bore 50 and a fuel additive passageway therein 52.

The bore 50 extends between a first opening 54 and a second opening 56, at opposing ends of the delivery device 22. Further, the bore 50 may define a circular profile as depicted from a top view (see FIG. 5). The first opening 54 and second opening 56 may also be referred to as an upper opening and lower opening, respectively, as the delivery device 22 is oriented such that the second opening 56 or lower opening is positioned within the fuel tank. The bore 50 may extend centrally through the delivery device 22 along an axis 58 of the delivery device 22. Further, the bore 50 is sized and configured to receive a typical fuel spout (not shown), discussed in further detail hereafter. The bore 50 may also defme a nozzle 60. Such a nozzle 60 defined in the delivery device 22 or bore 50 may include a narrowed portion 62 defined by and adjacent a narrow neck 64. Such narrowed portion 62 defined within the bore 50 is an important aspect of the present invention, discussed in more detail herein.

The bore 50 may define various narrowing and widening portions along its axial length. For example, beginning from the first opening 54 toward the second opening 56, the bore 50 may define a first wall 66, a second wall 68, a third wall 70 and a fourth wall 72. The first wall 66 may be angled or tapered inward such that the diameter or width decreases toward the second wall 68. Further, the first wall 66 and may include air passageways 74, discussed in more detail relative to FIGS. 5 and 5A. The second wall 68 may include a substantially constant diameter and may be sized and configured to receive the before mentioned fuel spout (not shown). The third wall 70 may be tapered or angled with a diameter or width decreasing toward the fourth wall 72. The third wall 70 may be configured to facilitate abutment or engagement with the fuel spout to seat against while fueling the tank. The fourth wall 72 may extend in an angled or widening of the bore 50 to the second opening 56 so as to define a diameter or width that increases toward the second opening 56. With this arrangement, the third wall 70 and the fourth wall 72 converge to the narrow neck 64 to define the narrow portion 62 and defme the nozzle 60 within the bore 50. Such a nozzle 60 may be sized and configured to control flow characteristics of the fuel and fuel additive as fuel passes over and through the nozzle 60, discussed in more detail hereafter.

The fuel additive passageway 52 may extend adjacent to the narrowed portion 62 of the bore 50. The fuel additive passageway 52 is defined in the fuel additive delivery device 22 between a fuel additive inlet 76 and a fuel additive outlet 78. The fuel additive passageway 52 may include a first portion 80, a second portion 82, and a third portion 84. The first portion 80 of the fuel additive passageway 52 may extend horizontally or substantially perpendicular relative to the axis 58 of the bore 52 within the upper portion 32 of the delivery device 22. In particular, the first portion 80 extends between the fuel additive inlet 76 to the second portion 82 of the fuel additive passageway 82. The second portion 82 of the fuel additive passageway 52 may extend between the top face 38 of the delivery device 22 to the third portion 84, in which the second portion 82 may extend through the delivery device 22 substantially parallel with the axis 58 of the bore 50. The third portion 84 of the fuel additive passageway 52 may extend between the second portion 82 and the fuel additive outlet 78. The fuel additive outlet 78 is positioned adjacent the narrowed neck 64 of the bore 50 for reasons discussed hereafter.

In addition, the top face 38 of the fuel additive delivery device 22 defines a channel 46 sized and configured to hold a sealing ring 48. Such sealing ring 48 may be configured to provide an air-tight fit between the cap 40 and the fuel additive delivery device 22. Further, the channel 34 defined in the underside 36 of the upper portion 32 of the delivery device 22 may also include a ring 47 to provide a sealing fit between the fuel additive delivery device 22 and the rim 18 of the opening 14 of the fuel tank 12 (see FIG. 2). Once the delivery device 22 is positioned over the opening 14, the connection therebetween may be tightened via a tightening screw 49 or any other means known in the art for maintaining the delivery device 22 to the fuel tank 12 as well as ensuring the connection is sealed. Such ring 47 and sealing ring 48 may be employed with a polymeric material or any other suitable material known in the art that facilitates a sealing fit.

In another embodiment, the fuel additive delivery device 22 can be sized and configured to fit over most any opening of a fuel tank with a cam-lock arrangement (not shown). Such a cam-lock arrangement may include a cam and rubber sealing ring that is larger than most openings. Once the cam-lock arrangement is mounted over the opening, the cam can be manually leveraged to tighten around the rubber sealing ring so as to provide a sealing fit between the opening of the fuel tank and the fuel additive delivery device 22.

Figure 4:
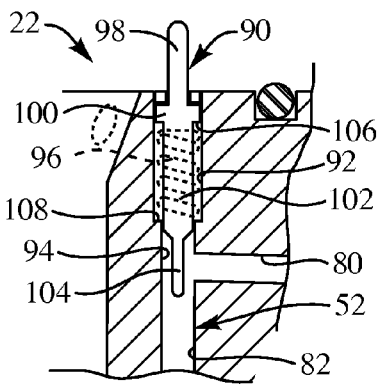
FIG. 4 is an enlarged partial cross-sectional view of the spring biased plunger in an open position, according to an embodiment of the present invention.

Now referring to FIGS. 3A and 4, the second portion 82 of the fuel additive passageway 52 may include a spring biased plunger 90. Further, the second portion 82 of the fuel additive passageway 52 may include a first part 92 and a second part 94, the first part 92 defining a greater diameter than the second part 94. The first part 92 is sized and configured to house and seat the spring biased plunger 90. The second part 94 is sized and configured to correspond with the plunger 90 between its blocking and open positions. In particular, such spring biased plunger 90 is moveable between a first position and a second position or a blocking position (FIG. 3A) and an open position (FIG. 4), respectively.

As depicted in FIG. 3A, the spring biased plunger 90 may be maintained in the blocking position with the cap 40 secured to the fuel additive delivery device 22. In other words, upon the cap 40 being secured to the delivery device 22, the cap 40 depresses the spring biased plunger 90 downward within the second portion 82 of the fuel additive passageway 52 to maintain the plunger 90 in the blocking position. In the blocking position or closed position, the spring biased plunger 90 is positioned so as to block communication between the first portion 80 and the second portion 82 of the fuel additive passageway 52. The spring biased plunger 90 is biased toward the open position via a spring 96 once the cap 40 is removed, thereby, moving the plunger 90 upward so that the first portion 80 of the fuel additive passageway 52 can communicate with the second portion 82 (see FIG. 4) and further, communicate with the third portion 84 of the fuel additive passageway 52.

FIG. 4 is an enlarged view of the spring biased plunger 90, depicting the plunger 90 in the open position with the cap 40 removed. The spring biased plunger 90 may be an elongated member with various abutment portions sized and configured to interact with the spring 96 and the change in sizing of the second portion 82 (sizing between the first part 92 and the second part 94) of the fuel additive passageway 52 where the plunger 90 is seated. For example, the plunger 90 may include an upper portion 98, an abutment portion 100, a mid portion 102 and a lower portion 104. The upper portion 98 may be configured to extend upward from the abutment portion 100, the upper portion 98 having a smaller width or diameter than the abutment portion 100. Further, the upper portion 98 interacts with the cap 40 when the cap 40 is secured to the delivery device 22 so as to maintain the plunger 90 to the closed position. The spring 96 may sit around the mid portion 102 and biases against a lower surface 106 of the abutment portion 100 and an upper facing surface 108 where the diameter changes between the first part 92 and second part 94 of the second portion 82 of the passageway 52. The lower portion 104 of the plunger 90 has a smaller width or diameter than the mid portion 102 such that when the cap 40 is removed fuel additive can bypass the lower portion 104 of the plunger 90 from the first portion 80 to the second portion 82 of the fuel additive passageway 52. Also, when the cap 40 is removed, the upper portion 98 of the plunger 90 moves upward above the top face 38 of the delivery device 22 via the spring 96, thereby, providing a visual to a user that the plunger 90 is in the open position.

Figure 5A:
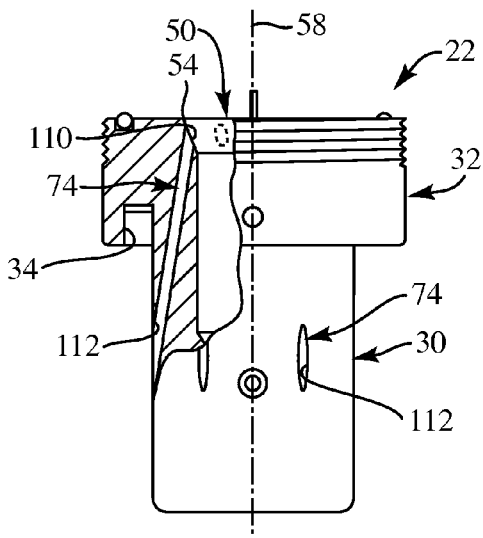
FIG. 5A is a partial cross-sectional view and side view of the fuel additive delivery device, taken along section line "5A" of FIG. 5, depicting air passageways in the delivery device and the spring biased plunger in an open position, according to an embodiment of the present invention.
Figure 5:
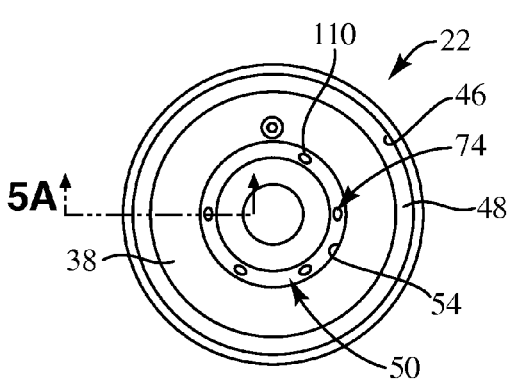
FIG. 5 is a top view of the fuel additive delivery device with a cap removed, according to an embodiment of the present invention.

With respect to FIGS. 5 and 5A, a top view and a partial cross-sectional view of the fuel additive delivery device 22, without the cap 40, is shown. As depicted, the sealing ring 48 extends within the channel 46 defined in the top face 38 of the delivery device 22. Such sealing ring 48 is configured to seal the fuel in a tank from the outside environment once the cap 40 (not shown) is positioned thereon. In addition, as previously set forth, the fuel additive delivery device 22 may include one or more air passageways 74. Such one or more air passageways 74 may extend between the upper portion 32 and the lower portion 30 of the delivery device 22, for example, between a first end 110 and a second end 112 of the air passageway. The first end 110 may be exposed adjacent the first opening 54 of the bore 50. The second end 112 may be exposed at an outer surface of the lower portion 30 of the delivery device 22. Further, the one or more air passageways 74 may extend at an angle or transverse relative to the axis 58 of the delivery device 22 or, in another embodiment, the air passageways 74 may extend substantially parallel with the axis 58 or may have one or more bends. The one or more air passageways 74 may be provided to facilitate transferring of air from the fuel tank to the outer environment while filling the fuel tank with fuel. In other words, as fuel in the fuel tank displaces the air while being filled, the air passageways 74 facilitate the transfer or displacement of air. As such, it is preferable that the first end 110 of the air passageway 74 be located above the channel 34 and the second end 112 of the air passageway 74 be located below the channel 34 defined at the underside 36 of the upper portion 32 of the delivery device 22. As previously set forth, the channel 34 provides a sealing connection via the polymeric ring 47 to the opening of the fuel tank (not shown).

Figure 6:
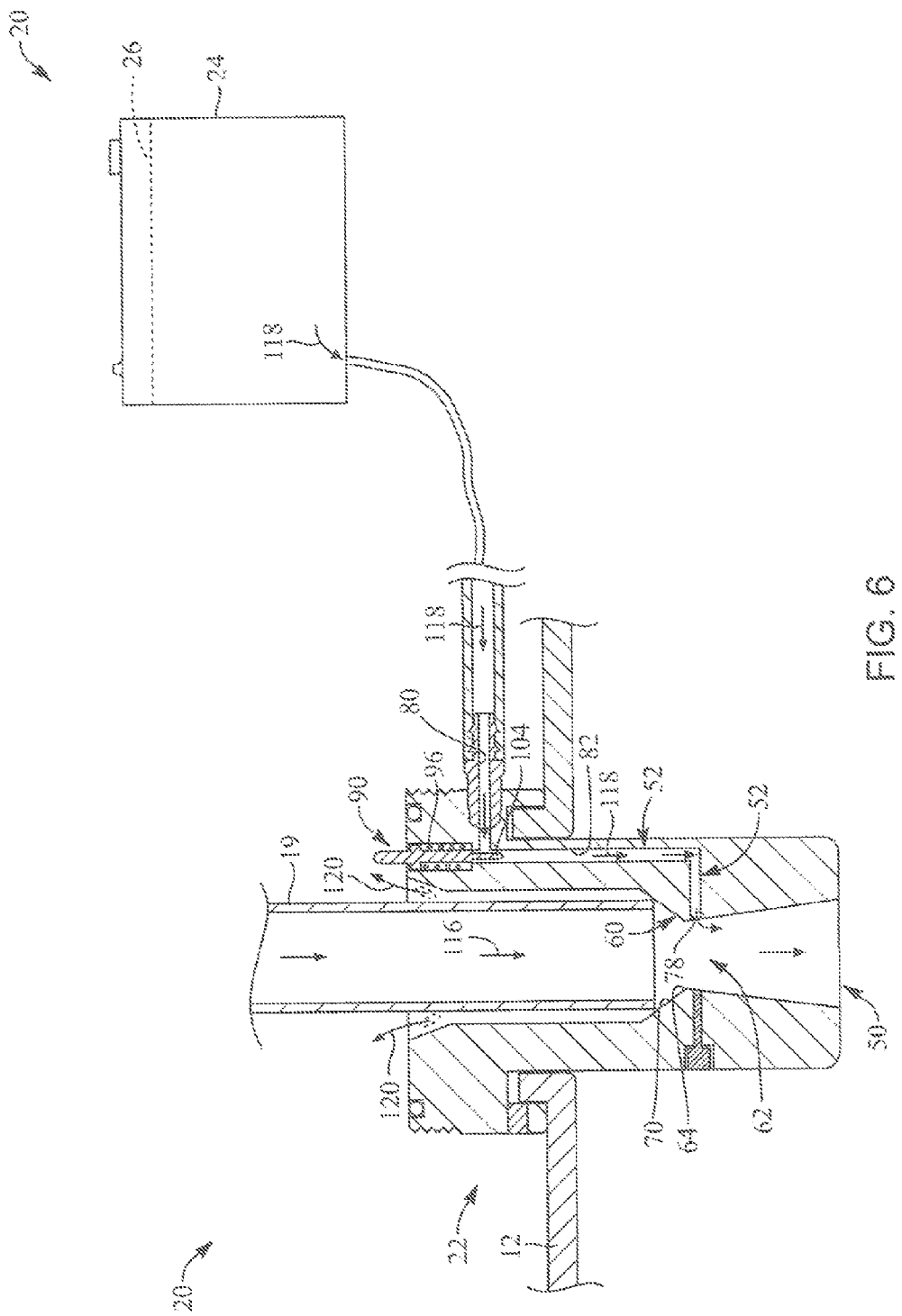
FIG. 6 provides a cross-sectional side view of the fuel additive delivery device and a schematic view of the container connected to the delivery device, depicting fuel additive advancing through the system to be mixed with the fuel in a fuel tank, according to an embodiment of the present invention.

Turning now to FIG. 6, the fuel additive dispensing system 20 in use, according to one embodiment, is shown. As depicted, the fuel additive delivery device 22 may be attached to a fuel tank 12 of a truck (not shown) with the cap 40 removed from the delivery device 22. As previously set forth, upon the cap 40 being removed, the spring biased plunger 90 automatically moves to an open position via the spring 96, which facilitates fluid communication from the first portion 80 to the second portion 82 of the fuel additive passageway 52. As a user then places a fuel filler spout 19 into the bore 50 of the fuel additive delivery device 22, the spout 19 may be positioned to abut or engage the third wall 70 of the bore 50 above the narrow neck 64. Due to the third wall being angled or narrowing the bore 50 and facilitating an abutment surface or engagement surface, the second wall may be sized and configured to accommodate most any typical fuel spout.

Once the fuel spout 19 is positioned in the bore 50 and fuel is passing through the bore 50 (as shown by arrow 116), the nozzle 60 defined in the bore 50 may manipulate the flow of the fuel. The flow characteristics of the fuel passing through the bore 50 may be manipulated by sizing the nozzle 60 to increase the velocity of the fuel as it passes therethrough and lowering the static pressure adjacent the narrow neck 64 and/or narrow portion 62. The fuel additive outlet 78 is positioned adjacent the narrow portion 62 or narrow neck 64 of the nozzle 60, facilitating the fuel additive to be drawn (shown by arrow 118) or creating a suction, thereby, drawing the fuel additive 26 from the container 24 and into the bore 50. In this manner, the fuel additive 26 is automatically drawn from the container 24, through the bore 50 with the fuel and mixed with the fuel in the fuel tank 12 of the truck. Once the user is finished filling the fuel tank 12, the user then removes the fuel filler spout 19 and replaces the cap 40 (not shown) to the fuel additive delivery device 22. As previously set forth, the cap 40 automatically compresses the spring loaded plunger 90 to the blocking position to fully block the flow of fuel additive 26 through the fuel additive passageway 52 (see FIG. 3A). Also, note that the air passageways are configured to transfer air from the fuel tank during the fuel filling process, as indicated by arrow 120. In this embodiment, the container holding the fuel additive may be positioned on, for example, the truck at a substantially similar level as the fuel additive delivery device 22.

In another embodiment, the container 24 may be positioned above the fuel additive delivery device 22 so as to facilitate movement of the fuel additive 26 through the fuel additive passageway 52 via a combination of both being drawn via the change in pressure to cause a suction as well as advancing through the fuel additive passageway 52 by the force of gravity. In another embodiment, the fuel additive outlet 78 in the bore 50 can be located along the bore 50 such that the fuel additive 26 advances from the container 24 and through the fuel additive passageway 52 substantially exclusively by gravity.

Further, as will be appreciated by one of ordinary skill in the art, the lower portion 104 of the plunger 90 may be sized with different widths or diameters (or completely removed) so as to manipulate the flow of fuel additive 26 bypassing the lower portion 104 of the plunger 90 since there may be variables between different fuel tanks 12 or connection points to the truck for the container 24, etc. In this manner, the plunger 90 can be readily adjusted, or switched out, at the time of connecting and calibrating the fuel additive delivery device 22 for a particular truck without having to modify the nozzle 60 or position of the fuel additive outlet 78 of the delivery device 22 to, therefore, ensure the appropriate amount of fuel additive 26 is automatically advanced into the fuel tank 12 with the fuel.

The fuel additive delivery device 22 may be manufactured by machining or molding components or a combination thereof, or any other suitable method or technique known to one of ordinary skill in the art. Further, the delivery device may be made from a metallic material, such as steel, or any other suitable metallic materials or polymeric materials or combinations thereof. For example, the spring biased plunger can be machined from a metallic material or a polymeric material, as known in the art.

Figure 7:
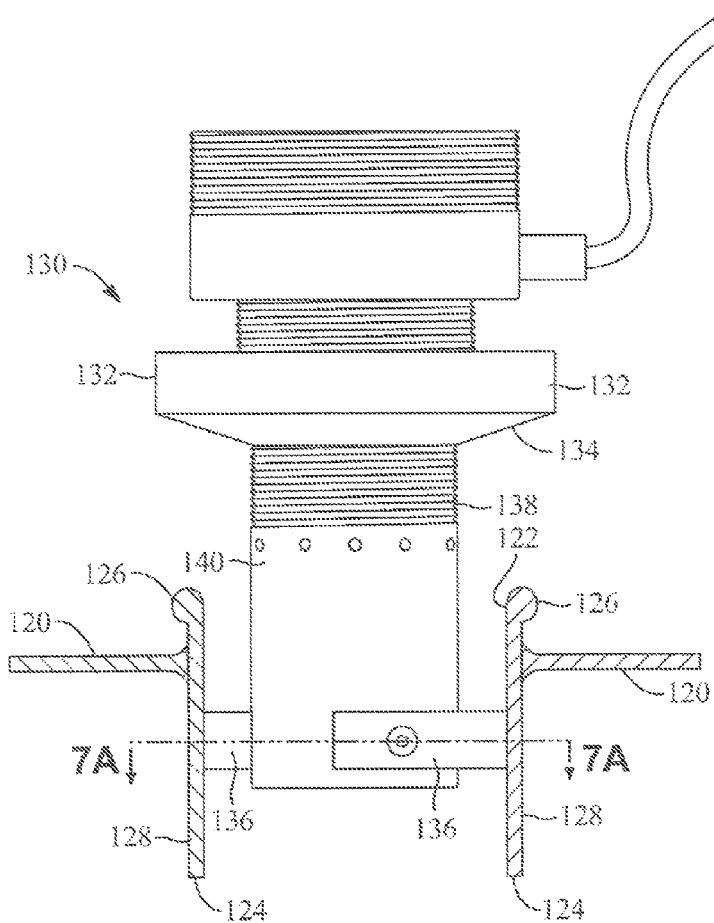
FIG. 7 is a side view of a fuel additive delivery device prior to being installed to a fuel tank, according to another embodiment of the present invention.
Figure 7A:
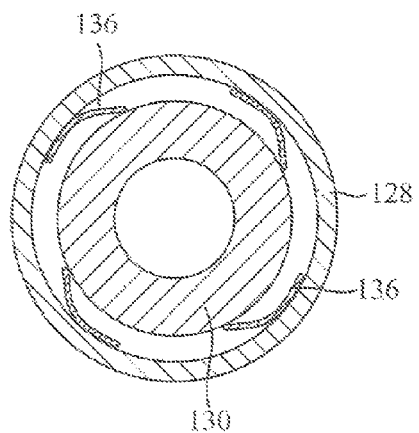
FIG. 7A is a cross-sectional view of the fuel additive delivery device taken along line 7A of FIG. 7, according to another embodiment of the present invention.
Figure 8:
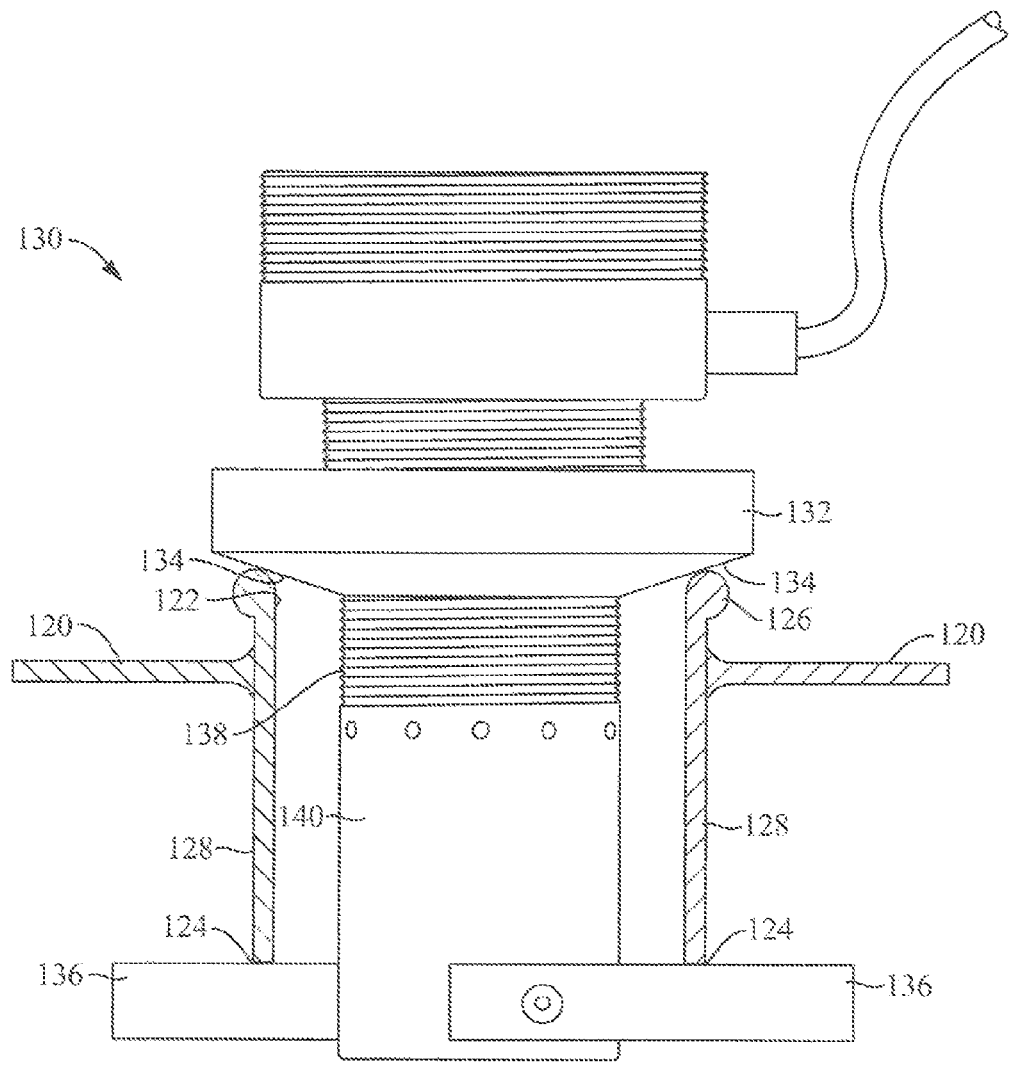
FIG. 8 is a side view of a fuel additive delivery device in an installed position, according to an embodiment of the present invention.

In another embodiment, the fuel additive delivery device, as set forth above, may include features and characteristics that facilitate attaching the fuel additive delivery device to most any sized opening of a fuel tank. For example, with reference to FIGS. 7, 7A, and 8, in one embodiment, a fuel additive delivery device 130 may include a nut 132 with a tapered surface 134 at an underside of the nut 132 and flexible tabs 136 or fins coupled to a lower portion 140 of the fuel additive delivery device 130. In addition, the outer surface of the lower portion 140 of the fuel additive delivery device 130 may include windings 138 or threads to correspond with threads (not shown) of the nut 132.

The tabs 136 or fins may be configured to act as a spring mechanism. The tabs 136 may be attached to the fuel additive delivery device 130 and sized and configured to extend beyond the inner dimension of the tank spout 128 in a fully expanded position and be flexible to be moved to a constricted position, such as when installing the fuel additive delivery device 130 to the opening 122 of the fuel tank 120. The tabs 136 may include various configurations to be moveable between the fully expanded position and the constricted position, such as, in one embodiment, the tabs 136 may be elongated to provide spring characteristics.

In order to insert the fuel additive delivery device 130, the installer may apply pressure while rotating the fuel additive delivery device 130 against the rim 126 of the opening 122 of the tank spout 128. The installer continues to apply pressure while rotating the fuel additive delivery device 130 until the delivery device and, specifically, the tabs 136 have moved beyond an inner lip 124 of the tank spout 128. At this position, the tabs 136 may bias toward and spring outward to their fully expanded position and catch or abut the inner lip 124 of the tank spout 128. With the tabs 136 extended to the fully expanded position, the fuel additive delivery device 130 is locked or held to the tank 120.

At this juncture, the nut 132 can now be turned via the windings 138 or threads to tighten the tapered surface 134 to the rim 126 of the opening 122 of the fuel tank 120. The nut 132 may also include a gasket seal (not shown) configured to form a tight seal against the rim 126 of the opening 122 of the fuel tank 120. Turning the nut 132 will draw the tabs 136 and gasket seal toward each other, enabling them to be drawn tight against each end of the tank spout 128 (the tabs 136 against the inner lip 124 and the gasket seal with the nut 132 against the rim 126). Also, the tapered surface 134 on the nut 132 facilitates the fuel additive delivery device 130 to self-center over the rim 126 of the fuel tank 120. With this arrangement, the tapered surface 134 of the nut 132 enables the fuel additive delivery device 130 to be mounted to a range of rim 126 sizes of the fuel tank 120. Further, the tabs 136 and nut 132 arrangement enables the fuel additive delivery device 130 to mount to a range of tank spout 128 lengths while also facilitating a sealing fit. Further, if necessary, the tabs 136 and nut 132 may easily be replaced with longer tabs and/or a larger nut to accommodate larger sizes if a tank spout is outside the standardized range.

For removal of the fuel additive delivery device 130 from the tank spout 128, the nut 132 may first be loosened, after which, the fuel additive delivery device 130 may be pulled while rotating (in the same direction as the installation). Such rotation and pulling force flexes or draws the tabs 136 back to a constricted position toward the lower portion 140 of the fuel additive delivery device 130 such that the fuel additive delivery device 130 can be removed. In this embodiment, without rotational movement, the tabs 136 grab or create friction with the tank spout 128, but with rotational movement and pulling/pushing, the tabs 136 flex and more readily facilitate removal/insertion, respectively, of the fuel additive delivery device 130 relative to the fuel tank 120. It is noted that, in this example, four tabs 136 are employed, however, additional or fewer tabs 136 may also be employed. Further, tabs 136 or structure having a different configuration may also be employed, such as an s-shaped configuration or an elongate structure with a curl at the end or any other suitable structure, that facilitates mounting and sealing the fuel additive delivery device 130 to a large range of tank spout/rim sizes for fuel tanks. In addition, the tabs 136 may be formed of metal or a polymeric material or any other suitable material and may be coupled to the fuel additive delivery device 130 employing any suitable fastening means.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A fuel treatment system configured to automatically dispense a fuel additive to a fuel tank, the system comprising:
   a container configured to hold a fuel additive therein; and
   a fuel additive delivery device defining a bore extending therethrough and a fuel additive passageway extending through the fuel additive delivery device and to the bore, the bore extending between an upper opening and a lower opening of the fuel additive delivery device, the delivery device configured to connect to an opening of the fuel tank such that the lower opening is positioned within the fuel tank, the delivery device including:

a spring biased plunger including an elongated structure and a spring, the elongated structure positioned adjacent the upper opening and moveable within the fuel additive passageway between an open position and a closed position, the open position configured to facilitate the fuel additive to advance from the container through the fuel additive passageway and into the bore of the fuel additive delivery device; and a cap configured to be positioned over the upper opening of the fuel additive delivery device so as to prevent fluid from entering the fuel tank and to maintain the spring biased plunger in the closed position such that the elongated structure directly blocks the fuel additive passageway, and, upon the cap being removed from the upper opening, the spring biased plunger being biased toward and moved to the open position.

2. The system of claim 1, wherein the fuel additive delivery device is configured to sealingly connect to the opening of the fuel tank.

3. The system of claim 1, wherein the fuel additive delivery device comprises one or more air passageways defined therein, each passageway extending through the delivery device between a first end and a second end of the passageway such that, upon the cap being removed from the upper opening, the first end is positioned on the delivery device so as to be above the fuel tank and the second end is positioned to be within the fuel tank.

4. The system of claim 1, wherein the container comprises a conduit extending to the fuel additive passageway defined in the fuel additive delivery device.

5. The system of claim 1, wherein the bore comprises a nozzle defined therein with a narrow neck configured to manipulate a pressure of fluid passing through the nozzle.

6. The system of claim 5, wherein the fuel additive passageway comprises a fuel additive outlet adjacent the narrow neck of the nozzle so as to facilitate the fuel additive to be drawn from the container as fuel passes through the nozzle.

7. The system of claim 6, wherein the container is positioned adjacent the fuel additive delivery device such that, upon the plunger being in the open position, the fuel additive advances through the fuel additive passageway by a combination of influences of gravity and being drawn from the container.

8. The system of claim 1, wherein the fuel additive passageway extends through a portion of the fuel additive delivery device between a fuel additive inlet and a fuel additive outlet, the fuel additive inlet is configured to receive the fuel additive from the container and the fuel additive outlet is configured to be exposed adjacent a narrow neck defined in the bore of the delivery device.

9. The system of claim 1, wherein the container is positioned adjacent the fuel additive delivery device such that, upon the plunger being in the open position, the fuel additive advances through the fuel additive passageway by gravity.

10. The system of claim 1, wherein the spring biased plunger comprises a blocking portion and a bypassing portion, the blocking portion configured to block the fuel additive passageway upon the spring biased plunger being in the closed position, and the bypassing portion being sized smaller than the blocking portion so as to facilitate the fuel additive to advance upon the plunger being in the open position.

11. The system of claim 1, wherein the delivery device comprises a tapered surface and tab arrangement configured to seal and mount the delivery device to a fuel tank.

12. A fuel additive delivery device configured to dispense a fuel additive into a fuel tank from a fuel additive container, the device comprising:

a structure configured to be connected to an opening of the fuel tank, the structure defining a bore extending therethrough and a fuel additive passageway extending through the structure and to the bore, the bore extending between an upper opening and a lower opening of the structure, the structure configured to be positioned around the opening of the fuel tank with the lower opening disposed within the fuel tank;

a spring biased plunger including an elongated structure and a spring, the elongated structure positioned adjacent the upper opening and moveable within the fuel additive passageway between an open position and a closed position, the open position configured to facilitate the fuel additive to advance from the fuel additive container through the fuel additive passageway and into the bore of the structure; and a cap configured to be positioned over the upper opening of the structure so as to prevent fluid from entering the fuel tank and to maintain the spring biased plunger in the closed position such that the elongated structure directly blocks the fuel additive passageway, and, upon the cap being removed from the upper opening, the spring biased plunger being biased toward and moved to the open position.

13. The fuel additive delivery device of claim 12, wherein the structure is configured to sealingly connect to the opening of the fuel tank.

14. The fuel additive delivery device of claim 12, wherein the structure comprises one or more air passageways defined therein, each passageway extending through the structure between a first end and a second end of the passageway such that, upon the cap being removed from the upper opening, the first end is positioned on the delivery device so as to be above the fuel tank and the second end is positioned to be within the fuel tank.

15. The fuel additive delivery device of claim 12, wherein the bore comprises a nozzle defined therein with a narrow neck configured to manipulate a pressure of fluid passing through the nozzle.

16. The fuel additive delivery device of claim 15, wherein the fuel additive passageway comprises a fuel additive outlet exposed adjacent the narrow neck of the nozzle configured to facilitate the fuel additive to be drawn from the container as fuel passes through the nozzle.

17. The fuel additive delivery device of claim 16, wherein, upon the plunger being in the open position, the fuel additive passageway is configured to facilitate the fuel additive to advance by a combination of influences of gravity and being drawn from the container.

18. The fuel additive delivery device of claim 12, wherein the fuel additive passageway extends through a portion of the structure between a fuel additive inlet and a fuel additive outlet, the fuel additive inlet being configured to receive the fuel additive from the container and the fuel additive outlet being configured to be exposed adjacent a narrow neck defined in the bore of the delivery device.

19. The fuel additive delivery device of claim 12, wherein, upon the plunger being in the open position, the fuel additive passageway is configured to facilitate the fuel additive to advance by gravity.

20. The fuel additive delivery device of claim 12, wherein the spring biased plunger comprises a blocking portion and a bypassing portion, the blocking portion configured to block the fuel additive passageway upon the spring biased plunger being in the closed position, and the bypassing portion being sized smaller than the blocking portion so as to facilitate the fuel additive to advance upon the plunger being in the open position.

21. A method of dispensing fuel additive to a fuel tank, the method comprising:
   providing a fuel additive delivery device connected to an opening of the fuel tank, the delivery device defining a bore extending therethrough between an upper opening and a lower opening and defining a fuel additive passageway extending at least partially adjacent to the bore, the lower opening positioned within the fuel tank and the upper opening positioned above the fuel tank;
   removing a cap secured to the upper opening, removal of the cap simultaneously moving an elongated structure of a spring loaded plunger within the fuel additive passageway from a blocking position to an open position to facilitate fuel additive to advance from a fuel additive container toward the bore of the fuel additive delivery device;
   inserting a fuel nozzle into the upper opening of the bore and passing fuel through the bore to fill the fuel tank;
   advancing fuel additive from the fuel additive container through the fuel additive passageway into the bore for mixing with the fuel in the fuel tank; and
   replacing the cap over the upper opening and simultaneously pushing the spring loaded plunger to the blocking position in the fuel additive passageway such that the elongated structure directly blocks the fuel additive passageway to prevent fuel additive from advancing in the passageway.

* * * * *